BEST AVAILABLE COPY

J. W. W.

GUN CARRIA.

No. 4,154. Reissued Oct. 11, 1870.

Witnesses.
J. Haynes
Rabean

J. Wall Wilson

2 Sheets—Sheet 2.

J. W. WILSON.

GUN CARRIAGE.

No. 4,154.

Reissued Oct. 11, 1870.

Witnesses:
Fred. Haynes
R. G. Rubens

J. Wall Wilson

United States Patent Office.

JOHN WALL WILSON, OF NEW YORK, N. Y.

Letters Patent No. 100,482, dated March 1, 1870; reissue No. 4,154, dated October 11, 1870.

IMPROVEMENT IN GUN-CARRIAGES.

The Schedule referred to in these Letters Patent and making part of the same

*To all whom it may concern:*

Be it known that I, JOHN WALL WILSON, of the city, county and State of New York, have invented certain new and useful Improvements in Gun-Carriages and their Slides, of which the following is a full, clear, and exact description, reference being had to the accompanying drawings forming part of this specification, and in which—

Figure 1:
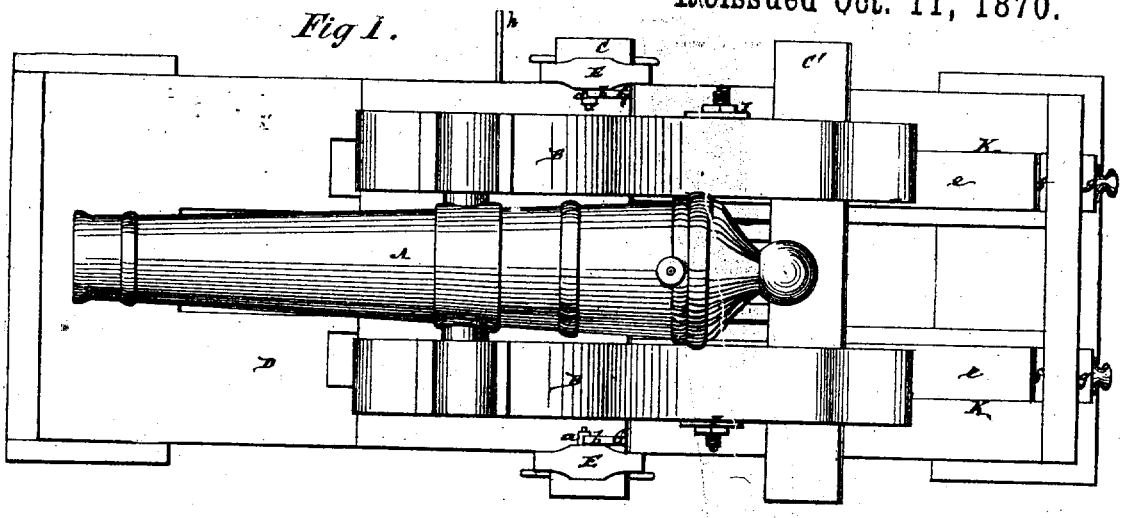
Figure 2:
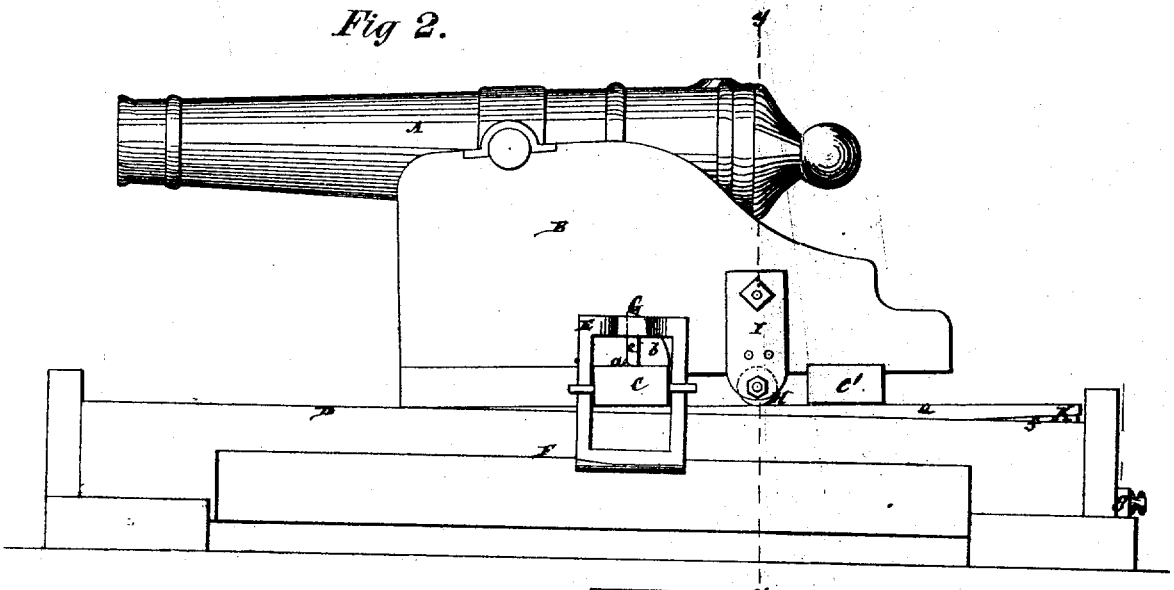
Figure 3:
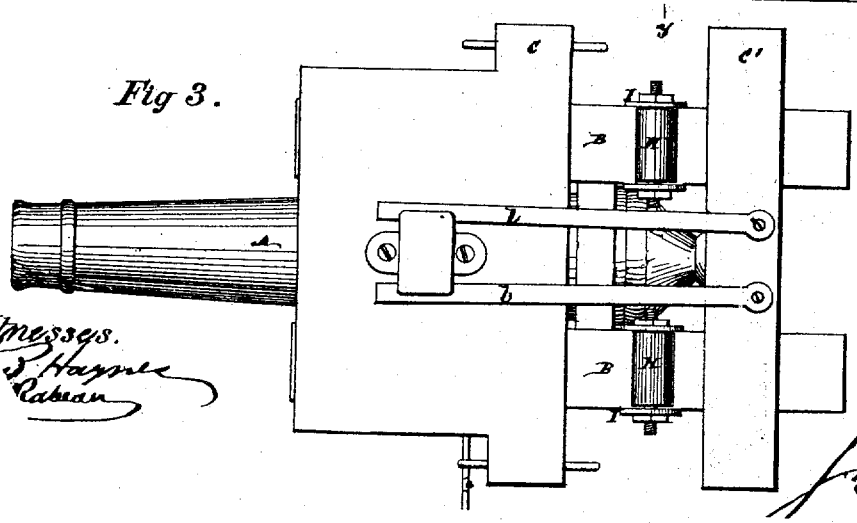
Figure 4:
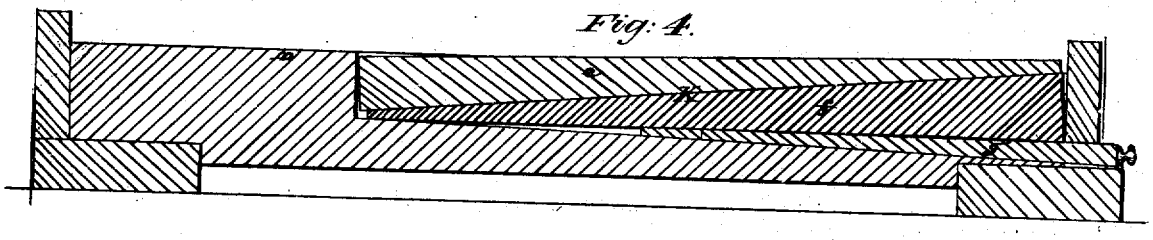
Figure 5:
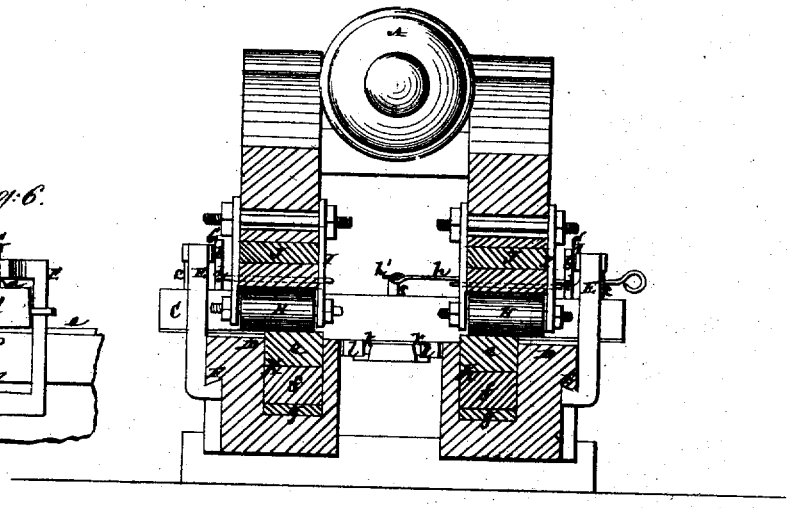
Figure 6:
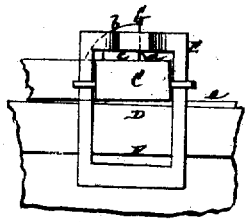
Figure 7:
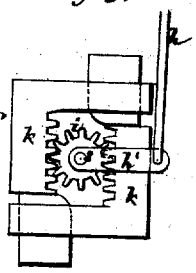

Figure 1 represents a plan of a gun-carriage, with the gun mounted thereon, and slides on which the carriage runs, in illustration of the invention;

Figure 2, a side view of the same;

Figure 3, an inverted plan of the carriage with gun attached;

Figure 4, a vertical longitudinal section thereof, taken, as indicated by the line *x x*, in fig. 1;

Figure 5, a vertical transverse section of the carriage, with gun thereon, and carriage-slides, such section being taken, as denoted by the line *y y*, in fig. 2;

Figure 6, a side elevation of one of the compressers in its released position, and device for operating the same; and Figure 7, an under view, on a larger scale, of certain means for checking the free run of the carriage when the compressers are released, applicable to guns on board ship.

Similar letters of reference indicate corresponding parts in the several figures.

In this invention I dispense with the usual compresser-screws, which are used to produce frictional hold of the carriage, with or on its slides, and which are objectionable, as making it extremely difficult, if not impossible, to tighten up both sides of the carriage alike, and in place of said screws, use eccentrics or cams, that have a fixed and equable action on both the compressers on opposite sides of the carriage.

The invention also dispenses with the usual eccentric rollers that are used to lift the carriage when the compressers are released, and it is required to run the carriage free from that frictional bearing on its slides, which serves to resist the recoil, said rollers being objectionable as requiring much labor to work them, and as necessitating hold to be retained on them while the carriage is being run; and, in place of such devices, the invention comprises rollers of a concentric character, borne down upon the carriage-slides by springs, which may be rubber blocks, of sufficient strength to carry the load of the carriage and its gun, and so that, when the compressers are released, said rollers operate as free running supports to the carriage, requiring no hold to be retained upon them when running the carriage, and being automatic in their action, accordingly as the compressers are released from or made to establish grip.

Likewise, the invention includes a combination of inclined elastic cushions or compressible spring-like devices, within or on the carriage-slides or rear portions thereof, and in direction of the length of the same, whereby an effective resistance is secured to the recoil in a gradual and easy manner, and which follows up the partial or preliminary resistance effected by the action of the compressers in the advance portion of the recoil of the carriage over the forward level or rigid portions of the slides.

This part of the invention also includes a peculiar construction of said cushions or compressible spring-like devices, to provide for the raising and lowering of them.

Furthermore, the invention embraces a combination of check-levers or brakes, and means for operating the same, from the exterior of the carriage, for checking, by frictional pressure against the slides, the free run of the carriage when the compressers are released.

This portion of the invention is designed to be used in connection with the guns on board ship, to counteract the rolling action of the ship on the carriage of the gun, or slip on the slides liable to be communicated thereto.

While the advantages, in part, at least, of the invention have here been enumerated, when treating the same under its several heads, it remains to be said in such relation that, by means of the invention, or certain features of it, the gun may be worked by fewer men, and there is little or no risk of breakage or injury to the carriage.

Referring to the accompanying drawings—

A represents the gun, and

B B, the sides or cheeks of its carriage.

C, the front, and

C', the rear transom thereof, and

D D, the slides of the bed upon which the carriage rests and runs.

E E are the compressers, and

F F, the bars or side projections from the slides, under and against which the compressers act.

These compressers are lifted, when it is required to bring the carriage down to a flat or frictional bearing by its transom on the slides, by means of eccentrics or cams G G, of leaf-like construction, to give a fixed and equable action to the same on the compressers, for which purpose said cams are hinged or suitably attached to the carriage, as at *a*, and formed of side pieces *b*, of sector or other suitable shape, with lifting and lowering wings *c*, projecting from them through the compressers, so that, on throwing said cams over in the one direction the wings *c* are made to assume a vertical position, or thereabout, which raises the compressers, and, on throwing them over in a reverse direction, said wings are brought into or made to approximate a horizontal position to lower the compressers.

Said cams may be thus operated by hand-spikes, made to enter holes *d* in the edges of their side pieces *b*.

These cams G G are alike on both sides of the carriage, and, as here arranged, require to be turned over in one direction, to lift the compressers up against the compresser-bars, and to be thrown over in a reverse direction when the compressers have to be dropped to free the carriage.

Said carriage, when thus released from any binding action of the compressers, it is proposed to relieve from bearing pressure by its transoms on the slides D D, by causing the carriage to be supported by concentric rollers H H, of which there may be front or rear pairs or sets, and which are carried in vertically-sliding frames I I, that are forced down or out by rubber blocks or springs J J, of sufficient strength to carry the weight of the gun and its carriage, or thereabout.

When supported by the concentrically-hung rollers H H, the carriage may be run with perfect freedom, and two or three men will suffice to work the gun instead of five, six, or more, as heretofore employed.

When the carriage is lowered, however, by the lift of the compressers, to bear down by its transoms on the slides, the rollers H H are automatically raised by the compression of the rubber blocks or springs J J, that bear down upon them.

To perfect the resistance to the recoil, which is only partially met by the action of the compressers E E, I provide inclined elastic cushions K K, or compressible spring-like devices, in or on the slides D D, or backward continuations thereof.

These cushions or spring-like devices may be variously constructed, but the construction represented in the drawings I find to answer the purpose, and the same will answer as well as any other to illustrate this feature of the invention.

Such cushions are formed of upper slides or slide continuations *e*, resting on springs that may, if desired, be made of India rubber, and of a shape to constitute elastic inclines *f f*, arranged to lie in direction of the slides, with their smaller ends in advance, and which springs are in their turn supported by quoins *g*.

On taking out these latter, which may be done from the rear of the slides, the upper slide-pieces *e* of the elastic cushions or compressible spring-like devices are brought on a level with the slides D D, or thereabout, which facilitates the working of the gun in mere training, but on inserting said quoins in their places beneath the springs of the cushions, as it is proposed to do in actual service, then the elastic cushions or compressible spring-like devices are raised to form inclines that operate by the bearing of the carriage-transoms on them, under the action of the compressers, to gradually but effectually arrest the recoil, and this, by the elasticity of the cushions or compressible spring-like devices, in a soft and easy manner, which prevents injury or breakage, said recoil being previously resisted in part during the run of the carriage over the forward or rigid portions of the slides.

In some cases, the quoins *g g* may be dispensed with or be fixtures, so as to give to the elastic cushions or compressible spring-like devices a permanent inclined character.

Said inclined elastic cushions or compressible spring-like devices have, in addition to their breaking the recoil, also another effect, namely, they force the breech of the gun upward, and thus prevent the rising of the muzzle, doing away with the use of all pivot-bolts except the center pivot, and thereby giving the gun the sweep of the entire circle.

Arranged in the base of the carriage is a vertical spindle, *s*, turned, when required to put "check" on the carriage after the release of the compressers, by pulling or pushing on a rod, *h*, which is connected by a crank or lever, *h'*, with said spindle, and may be operated from the outside of the carriage by a suitably-arranged lever.

This spindle *s* carries a pinion, *i*, which works, on reverse sides of it, into two bar-racks, *k k*, socketed to act as guides to each other, and arranged to bear against check-levers or brakes *l l*, pivoted to the carriage, and pressing, when forced apart by the bar-racks, through the action of the rod *h*, against the inner sides of the carriage-slides.

By these means it is only necessary, after the compressers have been released, and when it is required to check the gun-carriage from running on its slides, to pull or push on the rod *h*, which will induce sufficient frictional hold of the brakes or levers *l l*, on or against the slides D D, to have the desired effect of keeping said carriage at rest in or on its slides.

The brakes *l l* may, if desired, be differently formed and hung, and the means for operating them be varied.

Such attachments, in addition to operating as brakes, serve, also, as the usual guides to the carriage, and are not designed to be hung to operate as brakes on gun-carriages for land service, but only to operate as brakes, as well as guides, when applied to guns on board ship, to check the slip or free run of the carriage on its slides when the compressers are released, as liable to be produced by the rolling of the ship.

The gun-carriage is here supposed to be made of wood, as usual, and the several details connected with it are constructed in accordance. If said carriage be made of iron, the same will naturally suggest suitable changes in the details to accord therewith, especially as regards the suspension of the rollers H H and disposition of the rubber blocks or springs J J, which bear them down or outward.

*Claims.*

1. The combination of compresser-cams G G with the compressers E E, for operation in relation to the carriage, and with the compresser-bars F F, substantially as specified.

2. The combination of the eccentrically-hung rollers H H and rubber blocks or springs J J, operating to force them down or outward, with compressers arranged so that their lift causes the carriage to be borne down on the slides, or in a reverse direction to the thrust of the springs, essentially as herein set forth.

3. The elastic inclined cushions or compressible spring-like devices, arranged to form backward continuations of the slides on which the gun-carriage works, substantially as specified.

4. In the construction of said elastic cushions or compressible spring-like devices, the combination of the sliding or removable quoins *g g* with the springs *f f*, and the upper slides or slide continuations *e e*, essentially as described.

5. The combination of the brakes *l l*, with the gun-carriage, for operation upon or against the slides D D, substantially as specified.

6. The combination of the brakes *l l*, racks *k k*, and pinion *i*, with the gun-carriage, essentially as shown and described.

J. WALL WILSON.

Witnesses:
THOS. M. WALLER,
F. J. FOX.